United States Patent [19]

Räbiger et al.

[11] Patent Number: 4,897,236
[45] Date of Patent: Jan. 30, 1990

[54] METHOD AND APPARATUS FOR THE CONTINUOUS MANUFACTURE OF RUBBER OR POLYMER-BASED MIXTURES CONTAINING ADDITIVES

[75] Inventors: Norbert Räbiger, Lohmar; Manfred Dienst, Burgdorf, both of Fed. Rep. of Germany

[73] Assignee: Hermann Berstorff Maschinenbau GmbH, Hanover, Fed. Rep. of Germany

[21] Appl. No.: 239,598

[22] Filed: Sep. 1, 1988

[30] Foreign Application Priority Data

Sep. 2, 1987 [DE] Fed. Rep. of Germany ....... 3729237
Sep. 2, 1987 [DE] Fed. Rep. of Germany ....... 3729236

[51] Int. Cl.$^4$ .......................... B29B 7/48; B29C 47/78
[52] U.S. Cl. ........................... 264/211.23; 264/211.24; 264/237; 264/349; 366/79; 425/204; 425/208; 425/209; 425/378.1; 425/382.3
[58] Field of Search .............. 264/349, 211.21–211.24, 264/176.1, 237, 37, 105; 366/79; 425/204–208, 209, 376.1, 382.3, 382.4, 378.1, 379.1

[56] References Cited

U.S. PATENT DOCUMENTS

| | | | |
|---|---|---|---|
| 2,764,780 | 10/1956 | Reifenhäuser | 425/131.1 |
| 3,449,793 | 6/1969 | Weir | 425/201 |
| 3,745,200 | 7/1973 | Geyer | 425/205 |
| 3,923,291 | 12/1975 | Matsuoka et al. | 425/205 |
| 4,118,163 | 10/1978 | Lee | 425/146 |
| 4,136,969 | 1/1979 | Meyer | 425/208 |
| 4,227,870 | 10/1980 | Kim | 425/208 |
| 4,324,493 | 4/1982 | Colombo | 425/378.1 |
| 4,637,790 | 1/1987 | Klein | 425/208 |

FOREIGN PATENT DOCUMENTS

| | | | |
|---|---|---|---|
| 2040919 | 2/1972 | Fed. Rep. of Germany | 425/207 |
| 2226269 | 12/1974 | France | 425/205 |

Primary Examiner—Jeffery Thurlow
Attorney, Agent, or Firm—Foley & Lardner, Schwartz, Jeffery, Schwaab, Mack, Blumenthal & Evans

[57] ABSTRACT

A process and an apparatus for continuously producing a rubber mixture. In the process, the constituents of the mixture are fed into a twin-screw extruder and are masticated and homogenized therein, with approximately 5% of the mixture being discharged and the remainder being recycled for further homogenization and for mixing with fresh batches of the constituents being fed into the extruder. The recycled mixture is circulated to and returned from a cooled, annular chamber dispersed exteriorly of the chamber of the twin-screw extruder, with the annular chamber having outflow and inflow passages communicating with the interior of the extruder.

19 Claims, 7 Drawing Sheets

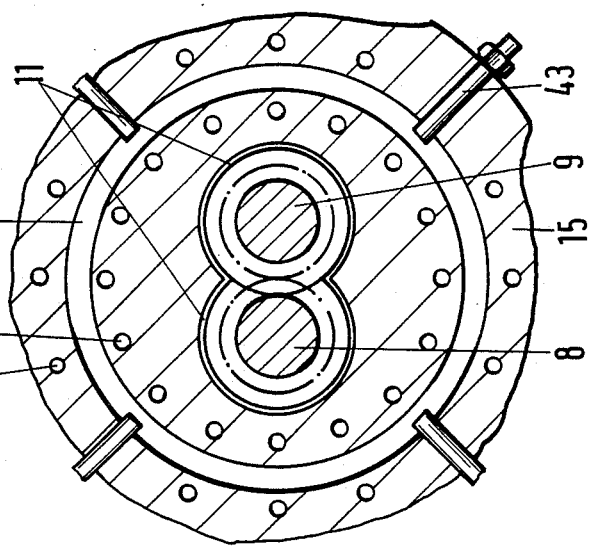
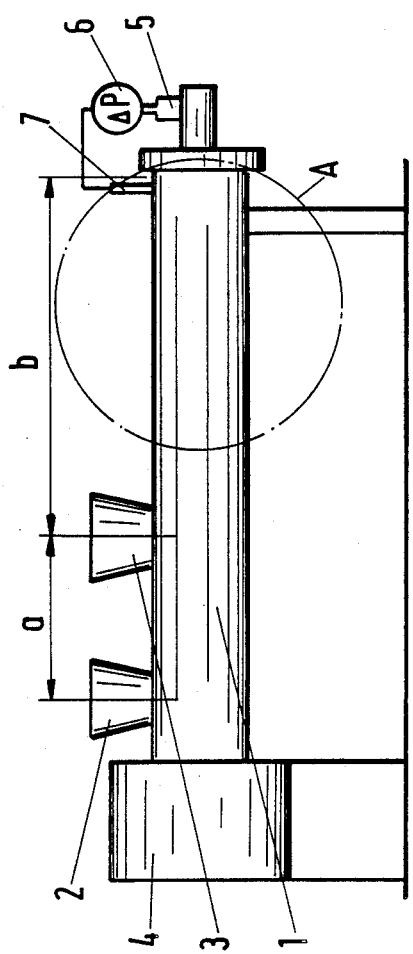
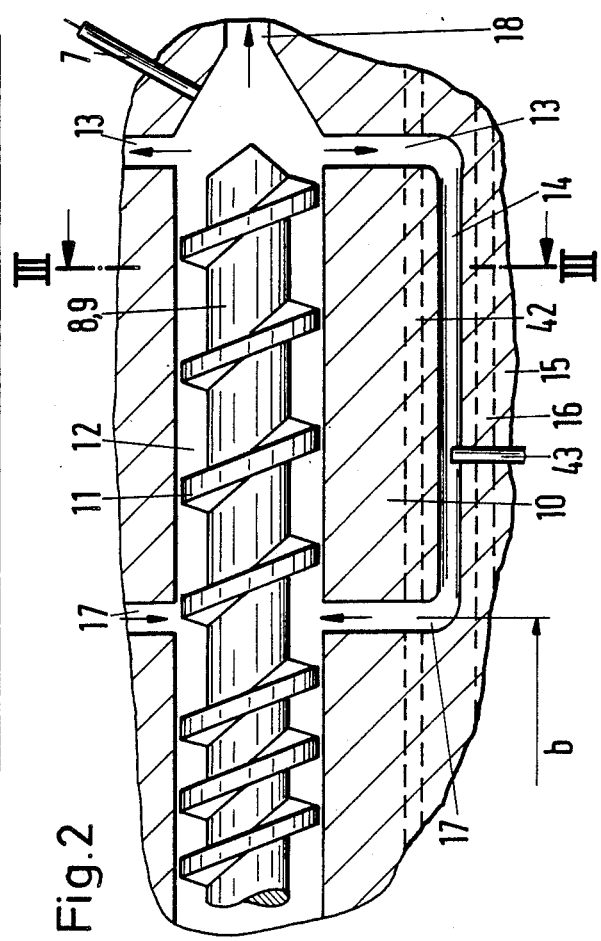

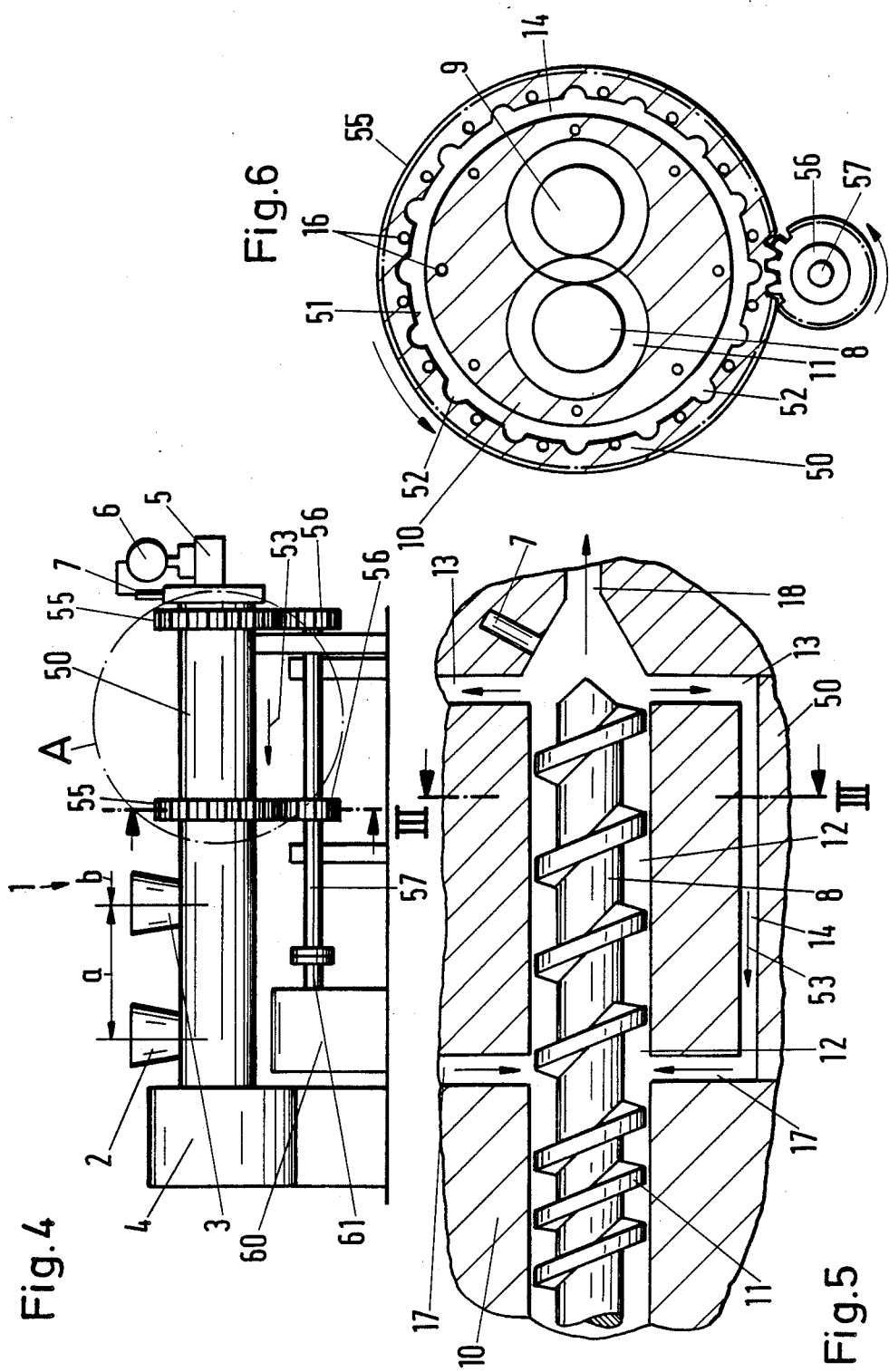

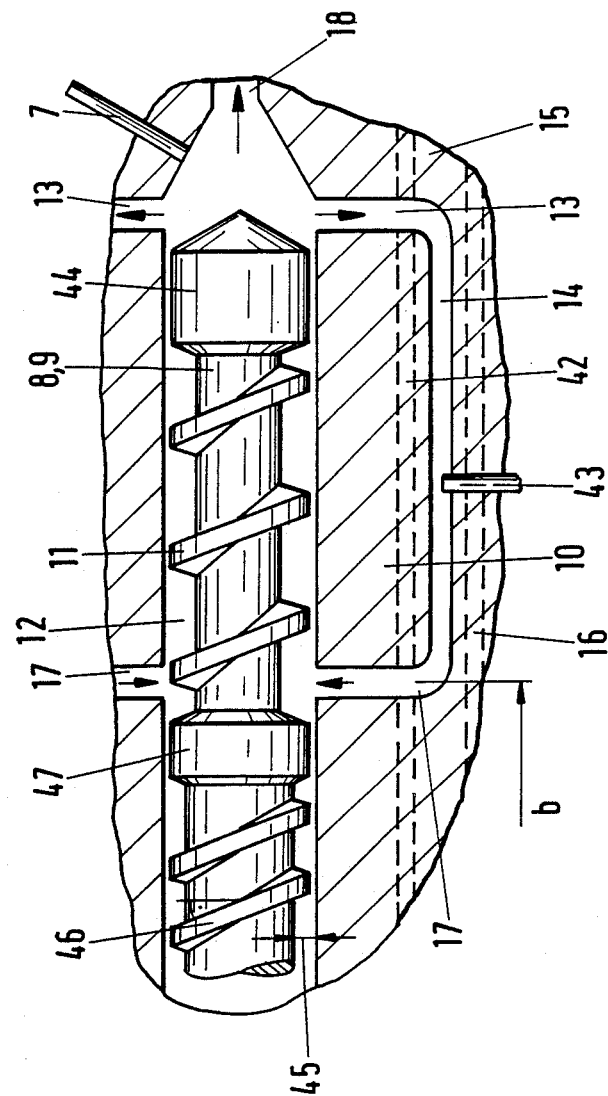

METHOD AND APPARATUS FOR THE CONTINUOUS MANUFACTURE OF RUBBER OR POLYMER-BASED MIXTURES CONTAINING ADDITIVES

FIELD OF THE INVENTION

The present invention relates to a method and apparatus for the continuous manufacture of rubber or polymer-based mixtures containing additives. More particularly, the present invention relates to an extrusion method and apparatus which is primarily, but not exclusively, intended for use in the production of rubber mixtures destined for further use in the production of vehicle tires.

BACKGROUND OF THE INVENTION AND PRIOR ART DISCUSSION

At the present time, there are no processes which are generally suitable for continuously producing rubber mixtures. This is due to the wide variations in the number of different constituents utilised for forming the mixture, in the metering characteristics of such constituents and the physical form in which they are supplied. A continuous process, known as the Buss process, is known but this can only be used for the processing of powdered rubber.

In such known process, the constituents are fed, in a metered manner, into a single-screw extruder at various points along the extruder. The flight of the screw is perforated and the screw itself performs a vibratory movement in an axial direction in order to improve the negative conveying characteristic necessary in a mixing process and, hence, to improve the dwell time behaviour in a screw conveying means. Although this compensates for fluctuations in the metering of the components and also compensates for local accumulations of individual constituents, it results in a locally differing, volume-related loss of efficiency. This causes a non-uniform dispersion of the additives, such as carbon black, in the mixture, poor heat transference and hence locally different degrees of mixing of the additive in the material. Despite the axial movement of the worm, the constituents are still inadequately intermixed axially during the mixing process, and such process cannot compensate for these differences in the mixing state in different regions of the extruder. This known process cannot be used for producing rubber mixtures containing a high content of carbon black and/or non-pulverulent rubber, nor can it be used for making mixtures containing natural rubber.

The mixing process described hereinbefore cannot be improved simply by using different screw constructions normally used in profile extrusion, in which the individual layers of the fluidised components are rearranged using various geometrical constructions and physical barriers. Specific constructions of this kind do not achieve any crucial change in the dwell-time characteristic of the mixture constituents.

Accordingly, rubber-containing mixtures have hitherto been manufactured almost exclusively by discontinuous processes. Internal mixers can be considered to be the best known type of apparatus used for carrying out such a process. The polymeric compound and, at predetermined intervals of time, the other constituents of the mixture, are introduced into the internal mixer, and the mixture is kneaded therein for a preselected period of time.

Owing to the geometry of the rotor and the constantly changing redistribution of the components, uniform homogenisation of the components of the mixture is achieved during such kneading operation. One disadvantage is, however, the unfavourable material volume-to-mixer surface area ratio and the resultant poor heat transfer. If, for example, carbon black is to be incorporated in the mixture, a plurality of such mixing operations is necessary. This is because the mixture becomes heated to an unacceptable level if a single-step operation is attempted. Accordingly, the carbon black is added in batches in a plurality of mixing operations.

A flow diagram of the process in accordance with the prior art is shown in FIG. 10. In this example, mastication of the rubber is effected in an intermittent process in an internal mixer, under constantly changing conditions and the mastication changes as a result of the continuously rising temperatures in the mixer.

The filler, the softener and some auxiliary substances are incorporated within the same intermittent process after the conclusion of the mastication process whilst a cross-linking agent and other auxiliary substances are incorporated in the mixture in a further intermittent mixing operation. This is carried out in a further internal mixer after the mixture batch has cooled. In the case of a very rapidly reacting finished mixture, an accelerator is added within a further mixing operation at the lowest possible temperature.

In the present state of the art, rubber mixtures are manufactured almost exclusively in intermittent processes in the internal mixer. In the example shown in FIG. 10, it is assumed that a containing mixture is being prepared. The natural rubber is masticated in the internal mixer after appropriate crushing and is thus prepared for receiving the other constituents of the mixture.

The mixing process in the internal mixer, which acts in a manner similar to an agitator vessel, produces a continuously rising temperature, resulting in constantly changing conditions and mastication behaviour.

Moreover, considerable differences in temperature occur in the compound as a result of the disadvantageous mixing behaviour and due to the poor dissipation of heat, so that the temperature control of process is, at best, very difficult and, at worst, impossible.

The filler and the softener, together with, if appropriate, auxiliary substances, are incorporated in the same intermittent process after the mastication has been concluded. In this connection, the entire quantity of softener and, if the mixture is to contain a high content of filler, a portion of the filler are added to the batch.

The constant redistribution in the internal mixer and the, by now, even more sharply rising temperature cause the incorporation of the filler into the mixture and subsequently the dispersion of the filler agglomerates. Since the dispersal process becomes increasingly impaired as the temperature rises, and the temperature rises more rapidly as the proportion of filler added to the mixture increases, the poor heat transference characteristics of the mixer means that the temperature cannot be kept constant therein. Accordingly, in practice, only a limited quantity of filler can be incorporated in each batch.

In consequence, when the desired filler content is to be high, the batch has to be subjected to further processing in a further intermittent mixing process in the internal mixer after the mixture has been cooled. In this further step, the remaining quantity of filler is incorporated into the mixture. It is sometimes necessary to carry out four or five cooling and remixing steps to incorporate the desired amount of filler into the mixture. The finished batch is subsequently rolled and is stored in the form of strips or in granular form for further processing.

The cross-linking agents are incorporated in the mixture in a further intermittent process in the internal mixer. The reaction is accompanied by a rise in temperature but this latter must not be allowed to exceed a pre-determined value.

Particularly in the case of rapid reactions, this can necessitate a plurality of mixing processes to introduce the cross-linking agents. It is essential that the constituents of the cross-linking system are uniformly distributed and homogenized in the batch, but this normally causes the temperature to rise rapidly in a detrimental manner.

For this reason, the conventional manufacture of a rubber-containing mixture can necessitate seven or eight separate mixing processes, with the consequential necessity for large storage capacities and a high expenditure on both machinery and personnel.

OBJECTS OF THE INVENTION

In order to carry out a continuous process for the manufacture of a rubber-containing mixture, the following criteria must be satisfied:

(a) It must permit a plurality of consecutive individual processes, such as mastication, the incorporation of carbon black, oil and other auxiliary substances into the mixture, and the incorporation of the cross-linking agents into the mixture to be carried out continuously.

(b) The mixing apparatus must have a large surface area so that the surface area to volume of mixture ratio is as high as possible.

(c) It must permit a uniform distribution of the volume-related feed performance by setting-up a defined shearing stress which is as constant as possible.

(d) There must be forced conveyance of the material and extensive radial mixing and dispersion must be produced.

(e) In each processing step, the dwell-time behaviour of an agitator vessel must be simulated in order to compensate for local inhomogeneities attributable to the metering of the materials and to the mixing and dispersing actions.

(f) The process must be easily controllable in order to ensure the quality of the final product, and (g) There must be efficient heat transfer in order to maintain a processing temperature which remains as constant as possible during and after each processing step.

An object of the present invention is, therefore, to provide a continuously operable process, which fulfils the above requirements, for manufacturing a homogeneous rubber-containing mixture.

The processing steps of masticating the rubber, incorporating a filler therein and also incorporating cross-linking agents therein are to be performed in a machine.

In particular, the ratio of the surface area of the machine used processing the mixture to the volume of the rubber mixture passing therethrough is large and this creates improved heat transfer conditions.

A further object of the invention is to provide an apparatus suitable for carrying out the process, which has a reduced introduction of shearing energy but which, at the same time, produces satisfactory longitudinal mixing of the mixture.

The rubber mixture in the return flow is at the same time to be better mixed and homogenized without any substantial increase in the pressure of the compound in the return-flow system, particularly in the annular gap.

SUMMARY OF THE INVENTION

According to the present invention, there is provided a method for the continuous production of a rubber-containing mixture comprising the steps of feeding rubber into a twin-screw extrusion device, said device comprising a housing defining at least first and second feed apertures and an outlet aperture, and two intermeshing screws rotatable within said housing, said screws having identical diameters, masticating said rubber in said extruder, metering additives to be admixed with said rubber into said extruder at a point downstream of said feed of said rubber at a spacing of from about one to ten times the diameter of each said screw from said rubber feed, mixing said additives with said rubber in said extrusion device, dividing said mixture into first and second part-streams at a point downstream of said feed of said additives at a spacing of up to about ten times the diameter of said screw from said additive feed, discharging said first part-stream from said extruder through said outlet aperture, said outlet aperture having an adjustable cross-sectional area, feeding said second part-stream, containing up to twenty times the quantity of the mixture in said first part-stream, into a return chamber, said return chamber having a length of at least about twice said screw diameter, cooling said mixture in said return chamber and returning said cooled second part-stream into said extruder utilising the feed pressure of said extruder, said re-entry point of said cooled mixture lying upstream of said outlet aperture.

Also according to the present invention there is provided an apparatus for the continuous production of a rubber-containing mixture comprising an extrusion device, said extrusion device comprising a housing; first and second intermeshing screws rotatable in said housing; first and second feed hopper means communicating with the interior of said housing; metering devices associated with each of said feed hopper means; said housing further defining an axial outlet means downstream of said feed hopper means, means for controlling said outlet means in dependence upon the pressure subsisting in said housing, and recycling means having first and second end regions communicating with said interior of said housing, said first end region of said recycling means lying in the region of, but upstream of, said outlet opening and said second end lying upstream of said first end, wherein said second hopper means is disposed downstream of said first hopper means at a longitudinal spacing of up to about ten times the diameter of said screws, wherein said recycling means comprise at least one outflow passage terminating in said first end region and extending radially from said housing, annular chamber means into which said outflow passage opens radially, said annular chamber extending co-axially with said housing and having a longitudinal length of at least twice said diameter of said screws, means for cooling said annular chamber, and at least one inflow passage extending radially inwardly from said annular chamber and terminating in said second end region.

In twin-screw extrusion processes, approximately 60% of the energy is converted in the feed zone. Accordingly, the major proportion of a rise in temperature will occur in this region. If carbon black is to be incorporated in the mixture, the carbon black, preferably after the mastication performed in the first stage, should therefore be added in a second stage at a longitudinal spacing of approximately five times the diameter of the screws from the feed hopper for the masticated rubber. The second stage is directly connected to the first stage. The previous mastication, that is to say, the rise in temperature of the rubber base results in the rapid incorporation of the carbon black into the mixture. The carbon black is incorporated in the subsequent section of the extruder and the dispersing of the agglomerates is commenced.

In order to obtain better compensation for fluctuations in the metering of the materials and for local inhomogeneities which may occur, the feed flow is mixed with a substantially larger flow of the mixture returning through the radial return passages and the annular chamber. This mixing of the two flows ideally takes place at a longitudinal spacing of some four times the diameter of the screws, downstream of the feed hopper for the carbon black. The return flow is taken from the mixture near the outlet end of the screw and is returned. It is therefore re-subjected to the dispersion process taking place between the inflow and outflow passages of the return system.

Mixing of this kind results in an agitator vessel-type behaviour, so that the longitudinal mixing behaviour normally lacking during an extrusion operation is compensated for, and preselected dispersion characteristics of the carbon black and other constituents can be established.

A further important feature with respect to the repeated return is the intensive cooling of the flow of the mixture in the annular chamber. This is very advantageous for the purpose of correcting a rising processing temperature. The cooling reduces the temperature reached at the return point, which brings about improved mastication and dispersal of the carbon black. The viscosity increases as the temperature decreases, whereby the introduction of shearing stresses into the compound is enhanced. There is a decisive improvement in the dispersing action after the carbon black has been incorporated.

An annular gap is provided to receive the returning material so that a high surface-to-volume ratio can be established.

The mastication of natural rubber may be made controllable for the first time if the connecting line between the stages is in the form of a pipe or by the provision of a single-worm extruder to act as a return chamber, with capillary tubes being used as connecting elements. The capillary tubes are provided with capillary viscometers, whereby a change in the viscosity can be detected immediately and can be compensated by simultaneously adjusting the rotational speed of the screw and the free cross-sectional area of the outlet opening. For this latter purpose, an adjustable shutter for controlling the flow of the delivery volume is provided. The feed capacity which increases with and increasing speed of rotation of the screws is compensated for by an increase in the return flow.

The good heat transfer within the return system, improved by the higher rate of flow, thus keeps the processing temperature substantially constant.

The process in accordance with the invention offers the following advantages of being continuous, of permitting control, regulation and on-line measurement of the viscosity when masticating natural rubber, of subjecting the rubber mixture to only small thermal stresses, of achieving very high homogeneity of the mixture because of the agitator vessel-type behaviour, of reducing the power input, which is mixture related, and obviating the need for intermediate storage of the rubber mixture during production.

In an apparatus comprising twin-screw extruder having two feed hoppers, one for the rubber and the other for the additives such as a filler in the form of carbon black, which feed hoppers are spaced from one another at a longitudinal spacing of up to ten times the screw diameter, the size of the outlet opening is restricted so as to cause a relatively high pressure to be set up in the outlet region of the extrusion device. Such pressure causes the rubber and additive mixture to pass into the return passage system. The return passage system comprises an outflow passage which leads radially from the extrusion chamber and which open into an annular gap or return chamber disposed coaxially around the housing of the extruder.

In the annular gap, the mixed material is conveyed in a direction parallel but opposite to its direction of conveyance in the extruder. The length of the gap is dependent upon the desired intensity of mixing.

The upstream end of the return chamber is connected to the extrusion chamber by inflow passages which re-enter the extrusion chamber in a radial direction. Such a construction produces a return flow or re-circulation of material, and such return flow, by being reintroduced into the extrusion chamber upstream of the outlet thereof, permits the mixture to be re-mixed together with a fresh flow of material from the feed hoppers.

This operation may be repeated as often as required. In each case, in dependence upon the magnitude of the free cross sectional area of the outlet opening of the extruder and upon the extrusion pressure, and so as to obtain optimum mixing in the manner of an agitator vessel, approximately 10% of the mixture is discharged through the extruder outlet and the remainder is recycled through the outflow passages, the annular gap and the inflow passages.

The annular gap is cooled in order to control the shearing energy which is introduced into the rubber mixture by the extrusion feed pressure. The shearing energy, although it ensures excellent longitudinal mixing, also leads to a rise in the temperature of the rubber mixture.

Cooling is effected through cooling bores provided in the housing of the extrusion device and/or through axial bores which are provided in the cylindrical casing and to which tempering units enabling circulation of the coolant are connected.

On the one hand, shearing energy needs to be introduced in order to improve the longitudinal mixing of the rubber mixture but, on the other hand, intensive cooling, to destroy a large proportion of the introduced energy is also necessary because the rubber mixture is very temperature-sensitive and hence predetermined thermal stress limits for the rubber mixture must not be exceeded.

A feed effect is achieved by the making of the cylindrical casing rotatable and providing the internal surface thereof with grooves. By so doing, the extrusion pressure in the return or re-circulating system is substantially reduced and a constant circulating time of the rubber mixture is achieved.

The rotation of the cylindrical casing to produce a feed action not only assists in producing the return flow of the mixture but also prevents a detrimental rise in the temperature of the mixture, whereby external cooling in this region can be reduced.

Moreover, the circulation of the mixture may be controlled with respect to time by such feature. That is to say, the conveyance of the material may be retarded or accelerated without altering the rotational speed of the twin screws.

An additional mixing and homogenizing effect is obtained without the need for introducing further shearing energy into the rubber mixture by increasing the pressure in the circulatory system.

The rate of feed may be deliberately affected by the design of the helical grooves in the rotatable cylindrical casing, that is, with respect to their pitch, their cross-sectional area and their depth.

A predetermined intensity of mixing and homogenization of the rubber mixture can be established by controlling the circumferential speed of rotation of the cylindrical casing.

BRIEF DESCRIPTION OF THE DRAWINGS

Various embodiments of an apparatus in accordance with the present invention will be further described by way of example, with reference to the accompanying drawings, in which:

FIG. 1 is a diagrammatical side elevational view of an extrusion apparatus in accordance with the present invention;

FIG. 2 shows a longitudinal sectional view of the detail "A" ringed in FIG. 1 and on an enlarged scale relative thereto;

FIG. 3 is a cross-sectional view taken along the line III—III of FIG. 2;

FIG. 4 is a diagrammatical side elevational view similar to that shown in FIG. 1, of a preferred embodiment of an apparatus in accordance with the present invention;

FIG. 5 shows a longitudinal sectional view of the detail "A" ringed in FIG. 4 and on an enlarged scale relative thereto;

FIG. 6 is a cross-sectional view taken along the line III—III of either FIG. 4 or FIG. 5;

FIG. 11 shows a view of a further embodiment of an apparatus in accordance with the present invention similar to that shown in FIGS. 2 and 5, but having different screws.

DESCRIPTION OF THE PREFERRED EMBODIMENT

Figure 7:
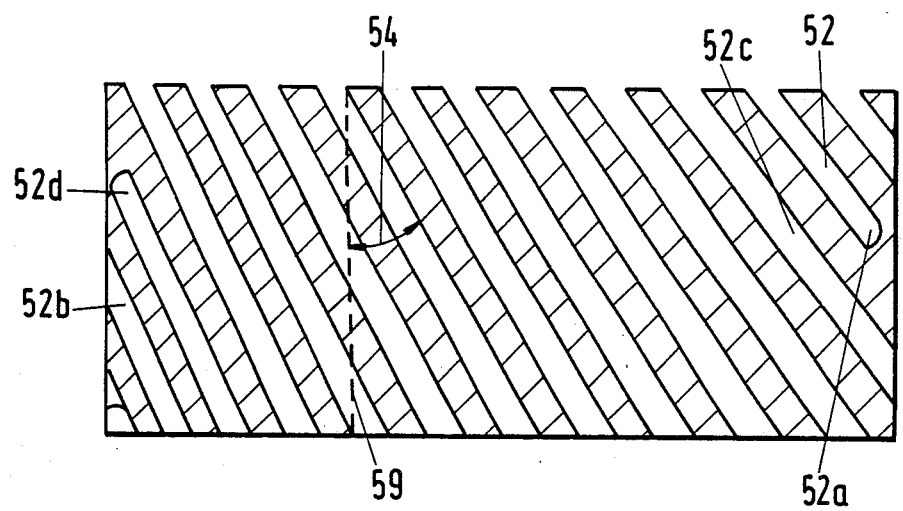
FIG. 7 shows a development of the internal surface of a cylindrical casing forming part of an apparatus in accordance with the present invention.

In FIG. 1, there is shown a twin-screw extruder 1 driven by a drive and transmission unit 4 and which is provided with two material feed hoppers 2 and 3 leading into the interior 12 of the barrel of the extruder 1. The feed hoppers 2 and 3 are spaced apart a distance "a" from one another.

A shutter 5, known in the art, is disposed at the outlet end of the extruder to control the free cross-sectional area of the outlet opening of the extruder 1. The shutter 5 is connected to a control unit 6 and is controlled in dependence upon the pressure values prevailing in the barrel of the extruder 1 upstream of the outlet opening. The pressure is measured by means of a meter 7.

The extruder 1 comprises two intermeshing screws 8 and 9 which rotate in the interior 12 of a barrel housing 10. The screws 8 and 9 have helical flights 11 disposed thereon, which convey virtually all the material fed into the extruder.

The extruder 1 has a forced feed and is virtually self-cleaning, since the flights 11 of the screws graze against one another during rotation and are so dimensioned that there is minimal clearance between the outer edges thereof and the internal wall of the housing 10.

Return passages or slots 13 lead from adjacent the outlet end of the extrusion chamber 12 into an annular gap 14 which is surrounded by a casing 15. Axially extending cooling bores 42 and 16 are provided in the housing 10 and casing 15 respectively in order that the temperatures of the housing and of the casing can be maintained at predetermined levels. A known tempering unit (not shown) is connected to the bores 16. Material passing through the slots or passages 13 into the annular gap 17 is returned to extrusion chamber 12 upstream of the slots or passages 13 through return passages or slots 14 which are disposed between the interior cooling bores 42.

Pulverized rubber is introduced into the chamber 12 through the feed hopper 2 by means of metering devices (not shown), is collected by the screws 8 and 9 and is masticated in the first screw portion "a". Auxiliary processing agents are also introduced simultaneously into the first feed hopper 2.

A filler material, generally carbon black, is introduced into the chamber 12 through the feedhopper 3 and joins the rubber which has already been partially masticated and which has been heated to approximately 60° to 80° C. by the shearing energy produced by such mastication. Furthermore, the desired proportions of softener and other auxiliary processing agents are also metered into the hopper 3.

The hopper 3 is spaced from the first return passage 17 by the distance "b" which must not be shorter than 4 D, where D is the screw diameter, in order to ensure adequate incorporation of the constituents fed through the hopper 3 into the mixture before the first mixing process with the flow of material returning through the passages 17 occurs.

The proportion of the material which passes into the passages 13 may be up to twenty times greater than the amount of material discharged. The returning material is then mixed with fresh incoming material which makes it possible to incorporate the substances into the mixture in a defined and controlled manner.

The pressure meter 7 measures the pressure upstream of the outlet opening 18, for example and, on the basis of the measured pressure, the size of the free flow-through cross section of the opening 18 is controlled by means of a control unit 6 connected to a shutter 5, so that the quantity of material flowing back through the annular gap 14 can be optionally adjusted. According to the desired final homogeneity, material may be returned through the passage 13, the annular gap 14 and the return passage 17 as often as required until the desired homogeneity is obtained. Up to one-twentieth, by volume, of the mixture in the apparatus is discharged in each case.

During its passage through the annular gap 14, the mixture is intensively cooled by the coolants in the cooling bores 16 in the casing 15 and in the cooling bores 42 formed in the housing 10, so that thermal stressing of the mixture cannot occur even if it is re-circulated several times. This fact is of particular importance because, in contrast to any known apparatus, the apparatus in accordance with the invention provides a large ratio of the volume of cooling surfaces to volume of material.

A further embodiment of an apparatus in accordance with the present invention is shown in FIGS. 4 to 7 and identical parts to those appearing in FIGS. 1 to 3 bear identical reference numerals. In this embodiment, however, the rubber mixture entering the annular gap 14 through the radial passages 13 is collected and further conveyed by the rotating casing 50 which replaces the casing 15 shown in FIGS. 1 to 3.

A rotary movement is imparted to the casing 50 by the provision of two pinions 56 which intermesh with teeth 55 formed on the exterior of the casing 50. The rotational speed of the shaft 57, on which the drive pinions 56 are disposed, is infinitely adjustable by utilising the output shaft 61 of the transmission unit 60. Moreover, the transmission unit 60 is so designed that it is also possible to reverse the direction of rotation in order to meet specific requirements with respect to the desired degree of homogeneity of the rubber mixture at any given time.

Grooves 52 are provided in the casing 50 and may be semicircular or rectangular in cross-section. The grooves are milled helically in the internal surface 51 of the casing 50 and have a pitch which is disposed at an angle 54 of from 0° to 90° in dependence upon the desired rate of feed of the mixture. In general, the smaller the pitch angle, the lower the rate of feed, assuming a uniform depth of groove and a constant circumferential speed of the casing 50.

The circumferential speed of the casing can be reduced to a considerable extent if axially extending grooves (not shown in the drawings) are chosen, that is to say, if the pitch angle of the grooves is 90°. It is then possible to perform very intensive transverse mixing of the rubber mixture due to the slow rotational speed of the casing 50. In such a case, the feed pressure is applied almost exclusively by the extrusion pressure subsisting in the double-screw extruder.

By reversing the direction of rotation of the casing 50 by reversing the transmission unit 60, but utilising the same pitch angle of the grooves 52, much shearing energy may be introduced into the rubber mixture at a very low rotational speed of the casing. This can be of major importance for specific rubber mixtures which are only stabilized at higher temperatures.

In order to prevent predetermined temperature limits from being exceeded, the casing 50 and the housing 10 of the extruder are tempered by the axial cooling bores 16 to which a known tempering unit (not shown) is connected.

By constructing the grooves 52 as shown in FIG. 7, with a closed inlet end 52a and an opened outlet end 52b in one groove and an open inlet end 52c and a closed outlet end 52d in the adjacent groove, all of the particles of material are sheared once by a flight between the grooves 52 before they are returned to the twin-screw extrusion chamber 12 through the return passages 17.

Very rapid homogenization of the rubber mixture is achieved by this procedure. In some cases, it may be advantageous to cool the rotatable cylindrical casing 50 and the extruder housing to prevent overheating.

Figure 8:
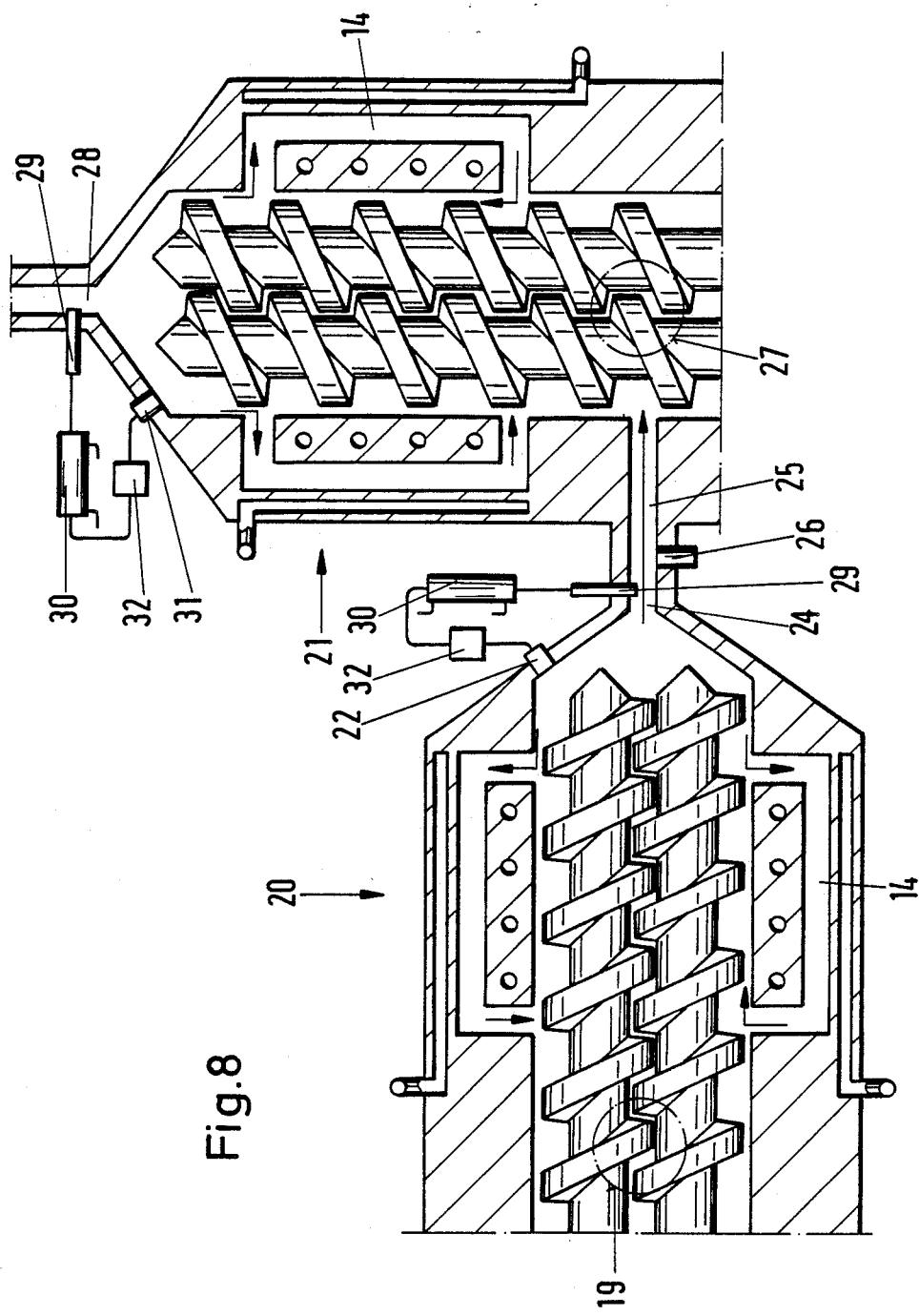
FIG. 8 is a horizontal longitudinal section through a further embodiment of an apparatus in accordance with the present invention.

Only mastication of the rubber is performed first in the case of most mixtures, so that an apparatus as shown in FIG. 8 may be used. In such a case, the rubber is in the form of pellets. This, and any necessary auxiliary processing agents, are introduced through a feed hopper 19 into the first 20 of two twin-screw extruders.

Mastication is effected in the manner described with reference to FIGS. 1 and 2. The pressure at the outlet end of the extruder 20 is determined by the meter 22 and, on the basis of the measured pressure, a control unit 32 connected to the meter 22 controls the size of the outlet opening.

The mixture then passes through a capillary tube 25, in which a capillary viscometer 26 for measuring the axial pressure gradient is disposed and then into a second twin-screw extruder 21. The mastication of natural rubber is also controllable by the provision of a capillary viscometer, since any change in the viscosity is detected immediately and compensation therefor is made by a simultaneous change in the rotational speed of the screws and in the size of the outlet opening 24, the latter being achieved by means of an adjustable shutter 29 for maintaining the feed volume flow.

If the output is increased due to an increase in the rotational speed of the screws, this is compensated by an increase in the return flows of the mixture through the annular gap 14. The efficient transfer of heat within the return system re-stabilizes the processing temperature.

In the apparatus shown in FIG. 8, carbon black and the oil are introduced through a feed hopper 27 into the second twin-screw extruder 21 and are dispersed therein. The extruder 21 is also provided with a slider 29 for controlling the free cross-sectional area of the outlet opening 28 of the extruder. The slider 29 is controlled by means of a hydraulic piston and cylinder arrangement 30 influenced by a control unit 32 on the basis of the pressure values measured adjacent the outlet of the second extruder 21 by a pressure meter 31.

Figure 9:
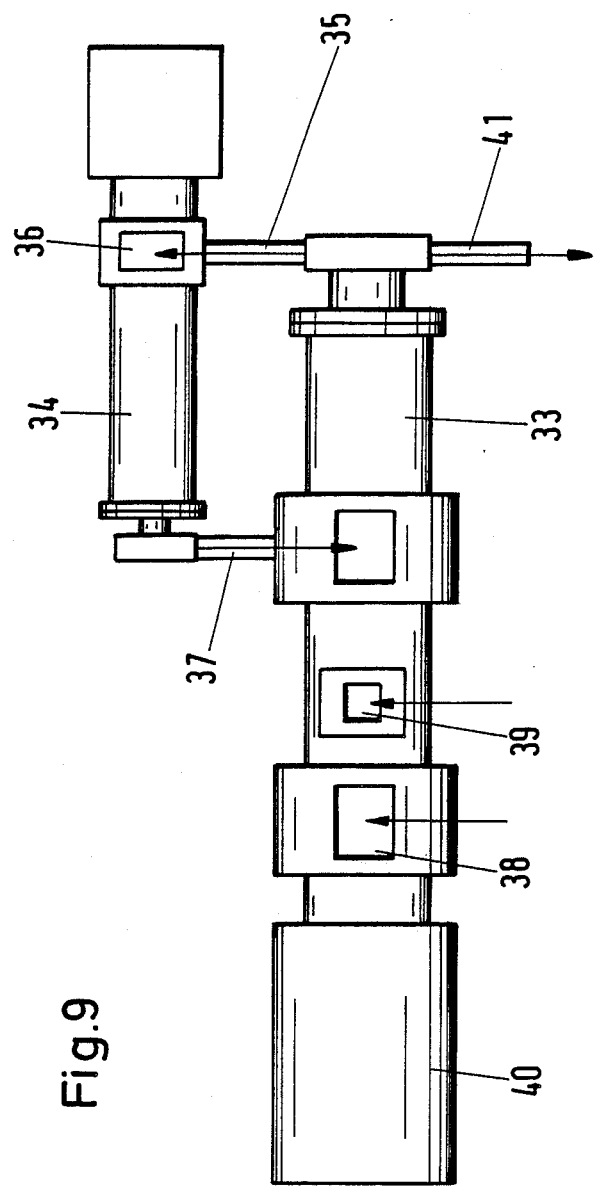
FIG. 9 shows a schematic view of a further embodiment of an apparatus in accordance with the present invention.

In the embodiment shown in FIG. 9, two twin-screw extruders 33, 34 are disposed side-by-side. In such embodiment, the twin-screw extruder 34 undertakes the function of the annular gap 14 shown in FIGS. 2, 3 and 8.

The extruder 33 is connected by conduits 35 to the extrusion chamber, in the form of a return chamber, of the extruder 34 at the inlet end 36 thereof. The outlet of the extruder 34 is connected, by conduits 37 to the inlet of the extruder 33.

The extruder 33 has a first feed aperture 38 for receiving pulverized rubber, and a second feed aperture 39 located downstream of the aperture 38 for the receiving the filler, the softener and any other auxiliary processing substances. The screws (not shown) are rotated by means of a drive and transmission unit 40 and perform the tasks of masticating, conveying and homogenizing the material.

In this embodiment also, up to one-twentieth of the volume of material fed into the extruder 33 is discharged and the rest recycled by closing the outlet opening 41 of the extruder 33. The material then passes into the extruder 34 which acts as a back-pressure chamber. The screws (not shown) of the extruder 34 return the mixture through the conduit 37 into the extruder 33.

The rubber mixture is likewise cooled in the extruder 34 by conventional cooling bores (not shown) connected to a tempering unit. The return flow of cooled mixture returns to the extruder 33 through the conduit 37.

Since only approximately 5% of the mixture is continuously discharged through the outlet opening 41, approximately 95% thereof is recycled in the apparatus, so that very intensive longitudinal and transverse mixing and dispersion is obtained without the setting up of thermal stresses. This is because a large cooling surface area is available in the extruder 34; such area comprising the cooling means for the housing and the internal cooling of the screws of this extruder.

A different geometry of the screws of the twin extruder is shown in the embodiment of FIG. 11. In region "b", the screws 8, 9 have flights having a larger pitch 46 than the pitch of the flights in the same region in FIG. 1, so that it is possible for the apparatus to cope with the rate of feed existing in region "b". An obstruction member 47 is disposed on the screw at the end of region "b" which leaves a relatively small free space between its periphery and the internal wall of the cylinder. Intensive shearing and homogenization takes place when the material passes the obstruction member 47.

The core diameter of the screws 8, 9 of the extruder has been increased in region "b", of the FIG. 11 embodiment so that the depth 45 of the thread is reduced. An increased material pressure is brought about by this measure and this enhances the shearing effect of the material by the obstruction member 47.

A further obstruction member 44 may also be disposed at the end of the screws 8, 9 in order to improve further the shearing effect, whereby more rapid homogenization of the mixture is also achieved.

In accordance with the invention, the working steps of masticating the rubber incorporating fillers and/or other auxiliary agents in the mixture and incorporating cross-linking agents are performed in at least one, preferably two, twin-screw extruders. These two extruders may be disposed one behind the other as shown in FIG. 8 and are operated continuously by establishing agitator-vessel type behaviour in each extruder and by providing intensive cooling. By this latter step, the high temperatures which would otherwise prevail are prevented.

An accelerator may be introduced into a single-screw mixing extruder to conclude the continuous process, so that immediate further processing, or the simple manufacture of lining strips after appropriate cooling has been effected, is possible.

Figure 10:
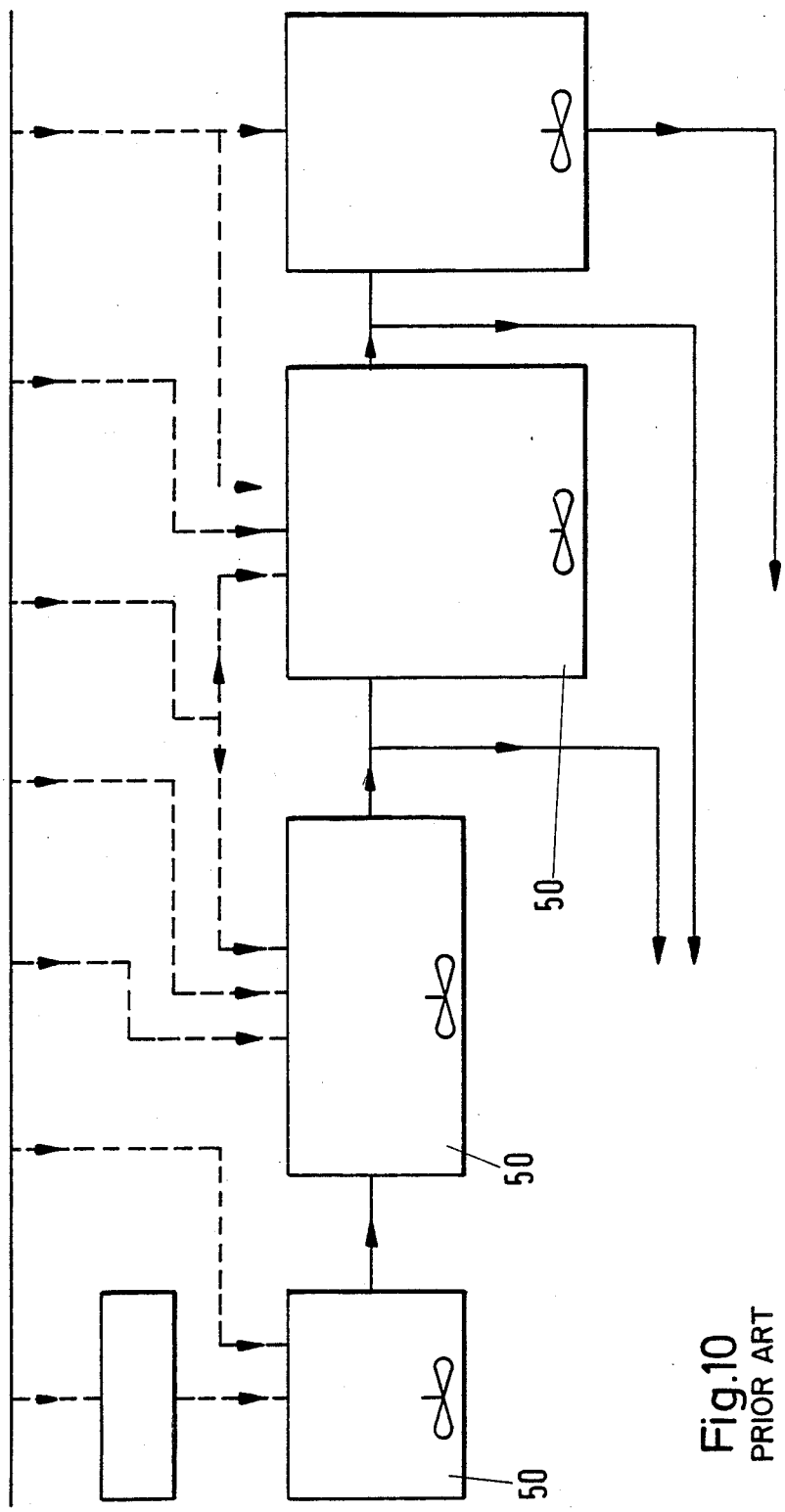
FIG. 10 illustrates, for comparative purposes only, a flow diagram showing a prior art process.

A comparison of the present invention with the prior art process flow diagram shown in FIG. 10 clearly shows that the process and apparatus in accordance with the invention satisfy the objects set forth hereinbefore.

We claim:

1. A method for the continuous production of a rubber-containing mixture in a twin-screw extrusion device comprising a housing, at least first and second feed apertures, and an outlet aperture adjacent the end of the extrusion device, comprising the steps of:
   (a) feeding rubber into said extrusion device through said first feed aperture and masticating said rubber,
   (b) metering additives to be admixed with said rubber through said second feed aperture, said second feed aperture being at a spacing from said first feed aperture of from about one to ten times the diameter of said screws,
   (c) mixing said additives with said rubber,
   (d) dividing said mixture of rubber and additives into first and second parts downstream of said second feed aperture at a spacing of up to about ten times the diameter of said screws,
   (e) discharging said first part through said outlet aperture,
   (f) feeding said second part, containing up to 20 times the quantity of said first part, into an annular chamber exteriorly of the extrusion chamber, said annular chamber having a length of at least about twice said screw diameter,
   (g) cooling said mixture in said annular chamber, and
   (h) returning said cooled second part into said extruder chamber utilizing the feed pressure of said extruder, said re-entry point of said cooled mixture lying upstream of said outlet aperture.

2. An apparatus for the continuous production of a rubber-containing mixture, comprising an extrusion device, said extrusion device comprising a housing; first and second intermeshing screws rotatable in said housing; first and second feed hopper means communicating with the interior of said housing; metering devices associated with each of said feed hopper means; said housing further defining an axial outlet means downstream of said feed hopper means, means for controlling said outlet means in dependence upon the pressure subsisting in said housing, and recycling means having first and second end regions communicating with said interior of said housing, said first end region of said recycling means lying in the region of, but upstream of, said outlet opening and said second end lying upstream of said first end, wherein said second hopper means is disposed downstream of said first hopper means at a longitudinal spacing of up to about ten times the diameter of said screws, wherein said recycling means comprises at least one outflow passage terminating in said first end region and extending radially from said housing, annular chamber means into which said outflow passage opens radially, said annular chamber comprising inner and radially outer wall surfaces, and extending co-axially with said housing and having a longitudinal length of at least twice said diameter of said screws, means for cooling said annular chamber, at least one inflow passage extending radially inwardly from said annular chamber and terminating in said second end region, and a cylindrical casing member including inner and outer wall surface, said inner wall surface of said casing forming said outer wall surface of said return chamber, said inner wall surface of said casing defining helical grooves therein, said helical grooves having a pitch for effecting the return of material in said chamber in an upstream direction.

3. An extrusion device for continuous production of a rubber-containing mixture, comprising:
   (a) a housing,
   (b) first and second intermeshing screws rotatable in said housing and defining with said housing an extrusion chamber for homogenizing said mixture,
   (c) first and second feed hopper means for receiving rubber and additives respectively, communicating with the interior of said housing, said second feed hopper being disposed downstream of said first hopper means at a longitudinal distance of up to about ten times the diameter of said screws, (d) outlet means adjacent the discharge end of said housing, and means for controlling the size of said outlet means dependence upon the pressure subsisting in said housing, (e) recycling means located exteriorly of said extrusion chamber for recycling said mixture and having first and second ends and an annular chamber therebetween, said annular chamber having a length of at least twice the diameter of each of said screws, said first end lying adjacent but upstream of said outlet means, and said second end lying upstream of said first end, (f) at least one outflow passage extending radially outwardly of said housing and communicating with said first end and said annular chamber of said recycling means, and at least one inflow passage extending radially from said housing and communicating with said second end and said annular chamber of said recycling means, and (g) means for cooling said annular chamber in order to cool said recycled mixture.

4. An apparatus as recited in claim 2, wherein said outer wall surface of said cylindrical casing carries external teeth, the apparatus further comprising pinion means meshing with said external teeth, drive shaft means attached to said pinions, transmission means communicating with said drive shaft means and drive means connected to said transmission means for driving said pinion means through the intermediary of said drive shaft means.

5. An apparatus as recited in claim 2, wherein said outer wall surface of said cylindrical casing carries external teeth, the apparatus further comprising pinion means meshing with said external teeth, drive shaft means attached to said pinions, transmission means communicating with said drive shaft means and drive means connected to said transmission means for driving said pinion means through the intermediary of said drive shaft means, said transmission unit including an infinitely adjustable output shaft connected to said drive shaft means, said drive means driving said output shaft in a selected direction of rotation.

6. An apparatus as recited in claim 2, wherein said grooves are disposed axially relative to the axis of said screws.

7. An apparatus as recited in claim 2, wherein said grooves are disposed at a pitch angle lying in the range of from 0° to 90°, with respect to a line perpendicular to the longitudinal axis of the housing.

8. An apparatus as recited in claim 2, wherein each said helical groove includes an inlet end portion and an outlet end portion opposed to said inlet end portion, said grooves being disposed in alternate first and second sets, said grooves in said first set having closed inlet ends and opened outlet ends and said grooves in said second set having opened inlet ends and closed outlet ends, each said groove in said first set lying adjacent a said groove in said second set and wherein said adjacent grooves define flights therebetween, said flights differing alternately in height.

9. An apparatus as recited in claim 3, wherein said annular chamber for said rubber mixture comprises a second, coolable extruder device, said second extruder device comprising an inlet connected to said outflow passage of said first extrusion device and in communication therewith, and an outlet connected to said inflow passage of said first extrusion device and in communication therewith.

10. An apparatus as recited in claim 3, wherein said outlet means comprises capillary tubes incorporating capillary viscometers integrally formed therewith.

11. An apparatus as recited in claim 3, wherein said screws include peripheral flight portions, said flight portions having smaller pitches in said region between said feed hoppers than downstream of said second feed hopper.

12. An apparatus as recited in claim 3, wherein said screws include peripheral flight portions, said flight portions defining a thread, said thread having a depth in said region between said feed hoppers which is less than the depth in said region downstream of said second feed hopper.

13. An apparatus as recited in claim 3, additionally comprising obstruction means mounted on said screws between said second feed hopper and said outlet means, said obstruction means exerting a shearing effect on the mixture passing thereby.

14. An apparatus as recited in claim 3, additionally comprising obstruction means mounted on said screws adjacent said outlet means to exert a shearing action on said mixture passing thereby.

15. An apparatus as recited in claim 3, additionally comprising externally adjustable pins projecting radially inwardly into said annular chamber.

16. An apparatus as recited in claim 3, additionally comprising obstruction means mounted on said screws adjacent said outlet means to exert a shearing action on said mixture passing thereby.

17. The extrusion device of claim 3 wherein said second feed hopper means is spaced from said outflow passage a distance equal to or greater than four times the screw diameter of each of said intermeshing screws.

18. The extrusion device of claim 3 wherein the size of said outlet means and said at least one outflow passage and annular chamber are such that only approximately 5% of the homogenized mixture is discharged through said outlet means, with the remaining being recycled to increase retention time so that the desired homogeneity can be obtained.

19. The extrusion device of claim 3 wherein said annular chamber is at least twice as long as the diameter of each of said screws, thereby substantially increasing the ratio of the surface area used for processing the mixture to the volume of the mixture passing through the extrusion device.

* * * * *